(12) United States Patent
Hoffmann

(10) Patent No.: US 12,466,693 B2
(45) Date of Patent: Nov. 11, 2025

(54) WINDING DRUM AND TORSION SPRING FOR A WINDING DRUM

(71) Applicant: IGUS GMBH, Cologne (DE)

(72) Inventor: Jan Hoffmann, Bonn (DE)

(73) Assignee: IGUS GMBH, Cologne (DE)

( * ) Notice: Subject to any disclaimer, the term of this patent is extended or adjusted under 35 U.S.C. 154(b) by 354 days.

(21) Appl. No.: 17/757,190

(22) PCT Filed: Dec. 2, 2020

(86) PCT No.: PCT/EP2020/084222
§ 371 (c)(1),
(2) Date: Jun. 10, 2022

(87) PCT Pub. No.: WO2021/115866
PCT Pub. Date: Jun. 17, 2021

(65) Prior Publication Data
US 2023/0011558 A1    Jan. 12, 2023

(30) Foreign Application Priority Data
Dec. 13, 2019  (DE) ............... 20 2019 106 965.1

(51) Int. Cl.
*B65H 75/48*   (2006.01)
*F03G 1/02*    (2006.01)
*H02G 11/02*   (2006.01)

(52) U.S. Cl.
CPC .......... *B65H 75/486* (2013.01); *F03G 1/026* (2021.08); *H02G 11/02* (2013.01)

(58) Field of Classification Search
CPC ........ B65H 75/48; B65H 75/486; B66D 1/02; B66D 1/28; B66D 2700/0116;
(Continued)

(56) References Cited

U.S. PATENT DOCUMENTS

| | | | | |
|---|---|---|---|---|
| 938,802 A | * | 11/1909 | Trotter | H02G 11/02 191/12.2 R |
| 1,640,670 A | * | 8/1927 | Schaeffer | F16C 11/12 464/86 |

(Continued)

FOREIGN PATENT DOCUMENTS

| | | | | |
|---|---|---|---|---|
| CN | 103847684 A | * | 6/2014 | ............. B60R 22/34 |
| CN | 105460818 A | * | 4/2016 | |

(Continued)

OTHER PUBLICATIONS

Office Action from related Canadian Appln. No. 3,164,470, dated Feb. 20, 2024.
(Continued)

*Primary Examiner* — Anna M Momper
*Assistant Examiner* — Henrix Soto
(74) *Attorney, Agent, or Firm* — Grossman, Tucker, Perreault & Pfleger, PLLC

(57) ABSTRACT

A winding drum for a line and/or for a line guide device which is adapted to receive and guide at least one line, wherein the drum is rotatable about the longitudinal axis thereof, wherein a first end region of the line and/or line guide device is or can be fixed to the drum and the line and/or line guide device can be wound on to and unwound from the drum by rotation of the winding drum in a winding-on and an unwinding direction about the drum longitudinal axis, wherein there is provided a drive device engaging the winding drum in order upon rotation of the drum in the unwinding direction thereof to exert a return force on the drum for rotation thereof in the winding-on direction. The drive device is in the form of a torsion spring which upon rotation of the drum in the unwinding direction is subjected to torsional stress and by virtue of the torsional stress exerts a torque on the drum for rotation thereof in the
(Continued)

winding-on direction and the torsional stress exerts the return force on the drum.

23 Claims, 7 Drawing Sheets

(58) Field of Classification Search
CPC . H02G 11/02; B66R 22/4676; B60R 22/3413; B60R 2022/287; B60R 2022/289; F16F 1/14; F16F 1/145; F03G 1/026; B60G 21/55; B60G 2206/427; B60G 2202/135; B60G 2202/42
USPC .......................................................... 242/371
See application file for complete search history.

(56) References Cited

U.S. PATENT DOCUMENTS

| | | | | |
|---|---|---|---|---|
| 2,283,784 | A * | 5/1942 | Billings | B66C 13/08 414/625 |
| 2,303,002 | A * | 11/1942 | Ruddock | B66C 13/08 414/625 |
| 2,702,674 | A * | 2/1955 | Willson | B67D 7/40 137/355.23 |
| 2,884,240 | A * | 4/1959 | Loughlin | B60G 11/00 464/86 |
| 2,946,563 | A * | 7/1960 | Eaton | F16G 11/12 410/37 |
| 3,061,234 | A * | 10/1962 | Morey | B65H 75/4449 242/378.2 |
| 3,062,479 | A * | 11/1962 | Griffitts | B66D 1/02 242/378 |
| 3,084,886 | A * | 4/1963 | Bastow | B65H 75/486 242/375 |
| 4,009,843 | A * | 3/1977 | Gomez | B65H 75/486 242/375 |
| 4,014,478 | A | 3/1977 | Bonacina | |
| 4,603,830 | A | 8/1986 | Franck | |
| 4,904,205 | A * | 2/1990 | Rice | H02G 11/02 74/505 |
| 5,344,095 | A * | 9/1994 | Frei | B60R 22/4619 242/384.2 |
| 5,573,198 | A | 11/1996 | Fassman et al. | |
| 6,206,315 | B1 * | 3/2001 | Wier | B60R 22/3413 242/379.1 |
| 6,382,548 | B1 * | 5/2002 | Nishizawa | B60R 22/3413 242/379.1 |
| 7,472,858 | B2 | 1/2009 | Gallego et al. | |
| 7,503,431 | B2 | 3/2009 | Sperber et al. | |
| 7,597,132 | B2 | 10/2009 | Wieczorek et al. | |
| 9,822,835 | B1 * | 11/2017 | Keefe | F16F 1/145 |
| 2002/0070307 | A1 * | 6/2002 | Hiramatsu | B60R 22/4676 242/379.1 |
| 2003/0192974 | A1 | 10/2003 | Hopper | |
| 2005/0051406 | A1 * | 3/2005 | Hopper | B65H 75/486 248/330.1 |
| 2006/0131456 | A1 * | 6/2006 | Romero | B60R 22/3413 242/382 |
| 2007/0074829 | A1 | 4/2007 | Wieczorek et al. | |
| 2007/0075173 | A1 * | 4/2007 | Boelstler | B60R 22/3413 242/379 |
| 2013/0126657 | A1 * | 5/2013 | Stroik, Jr. | B60R 22/3413 242/379.1 |
| 2014/0075772 | A1 * | 3/2014 | Delneo | B65H 75/30 242/372 |
| 2020/0185900 | A1 | 6/2020 | Theiss | |

FOREIGN PATENT DOCUMENTS

| | | | | |
|---|---|---|---|---|
| CN | 107477260 A | * | 12/2017 | |
| CN | 109562905 | | 4/2019 | |
| DE | 2506663 | | 8/1975 | |
| DE | 2634245 | | 3/1977 | |
| DE | 10338091 | | 5/2005 | |
| DE | 202011107804 | | 12/2011 | |
| DE | 102016104700 | | 9/2017 | |
| DE | 202017102310 U1 | * | 9/2017 | ............. B65H 57/04 |
| EP | 1638174 | | 3/2006 | |
| GB | 711713 A | * | 7/1954 | |
| GB | 2189763 A | * | 11/1987 | ........... B25H 1/0028 |
| JP | 60-95229 | | 5/1985 | |
| JP | 2-236032 | | 9/1990 | |
| JP | 2006-316995 | | 11/2006 | |
| KR | 10-2015-0078235 | | 7/2015 | |
| TW | I285183 | | 8/2007 | |
| WO | 2011086198 | | 7/2011 | |

OTHER PUBLICATIONS

International Search Report from corresponding PCT Appln. No. PCT/EP2020/084222, dated Feb. 17, 2021.
International Preliminary Report on Patentability from corresponding PCT Appln. No. PCT/EP2020/084222, dated May 17, 2022.
Office Action from related Canadian Appln. No. 3,164,470, dated Nov. 4, 2024.
Office Action from related Japanese Appln. No. 2022-535828, dated Jan. 14, 2025. English translation attached.
Office Action from related Taiwanese Appln. No. 109143826, dated May 10, 2024.
Office Action from related Chinese Appln. No. 202080096460.2, dated Apr. 12, 2025. English translation attached.

* cited by examiner

WINDING DRUM AND TORSION SPRING FOR A WINDING DRUM

FIELD

The invention concerns a winding drum for at least one line and/or for at least one line guide device. The invention further concerns a torsion spring, for example for a or having a said winding drum and an apparatus having a winding drum and/or a torsion spring.

BACKGROUND

Winding drums of the general kind set forth are used in or with apparatuses like machines or devices in order to wind up and unwind the line and/or line guide device arranged on the drum in operation of the corresponding apparatuses by rotation of the drum about the longitudinal axis thereof, and thereby to be able to adjust the unwound length of the line and/or the line guide device to the respectively given or intended operating state of the apparatus. In that case the free end of the line and/or line guide device can be provided with a moveable entrainment member as part of said apparatus, wherein in operation of the apparatus the entrainment member is moved at different spacings transversely or perpendicularly to the drum longitudinal axis. In order to transfer the line and/or line guide device into an at least partially unwound state the entrainment member or another device can exert a pulling force on the line and/or line guide device or unwinding is effected for example by motor means involving driving the drum. For rotating the drum in the winding take-up direction and possibly also in the unwinding direction thereof use is often made of an electric motor, which however is on the one hand complicated and expensive and cost-intensive. On the other hand an electric motor requires a separate power supply, and the provision thereof can be a complication in terms of apparatus structure. In particular however an electric motor also includes metal components like coils, housing and so forth.

For the operation of certain apparatuses however it is desired or required that devices thereof do not influence or interfere with electrical, magnetic or electromagnetic fields of the surroundings, or themselves emit such fields, as would be the case for example with an electric motor. Such apparatuses can be for example measuring apparatuses including medical diagnostic equipment, for example magnetic resonance spectroscopic apparatuses like magnetic resonance scanners (MRI scanners). Thus for example an electric motor emits electromagnetic fields and influences electromagnetic fields in the surroundings, which could interfere with the operation of that apparatus. Admittedly parts of an apparatus like an electric motor can be electromagnetically encapsulated in order to avoid electromagnetic disturbances in the surroundings, however that is generally highly complex and very involved.

In addition there is often a need to design the drive for the winding drum in structurally simple and space-saving fashion in the winding take-up direction thereof and if possible to make it low-maintenance.

SUMMARY

The object of the invention is to at least partially or completely resolve the above-indicated problems.

For at least partially or completely attaining the object there is provided a winding drum and a torsion spring for a winding drum or having such a winding drum. The invention further concerns an apparatus having a winding drum and/or a torsion spring.

Advantageous configurations are set forth in the appendant claims.

According to the invention the drive device of the winding drum is in the form of a torsion spring. Upon rotation of the drum about its longitudinal axis in the unwinding direction thereof the torsion spring exerts a return force on the drum, wherein the return force exerts a force on the drum for rotating the drum in the winding take-up direction. Upon rotation of the drum in the unwinding direction the torsion spring is stressed in torsion and, by virtue of the torsional stress generated thereby, exerts a torque on the drum, which acts for rotation thereof in the winding direction. The torsional stress thus exerts the return force on the drum in order to rotate it in its winding direction when that return force exceeds the force for rotating the drum in the winding direction. The stressing force for the torsion spring can for example be exerted by a tensile force being exerted on the second end region of the line and/or line guide device (referred to as the "free end region") which is arranged at the unwound region of the line and/or line guide device. That tensile force can be applied for example by the unwound end region of the line and/or line guide device being coupled to an entrainment member of the apparatus, wherein the entrainment member and/or said end region is spaced from the drum transversely or in particular perpendicularly to the longitudinal axis of the drum. The entrainment member can be displaced for example by a drive which is part of the apparatus, in which case the line and/or line guide device, which is arranged or wound on to the drum, is coupled in media-transmitting relationship to the apparatus in order to supply the apparatus with a medium and/or to discharge media from the apparatus. The medium or media can be for example electric power, fluid media, hydraulic or pneumatic media or also information data including electromagnetic or acoustic waves. The entrainment member and/or the end region to be unwound of the line and/or line guide device can also be moved by some other apparatus or in particular also manually with an increase in the spacing between the entrainment member and the drum. The above-mentioned tensile force can thus be exerted in particular in the longitudinal direction of the part of the line and/or line guide device, that is unwound from the drum. If the tensile force is reduced or if the application of a tensile force no longer occurs then the return force exerted by the torsion spring by virtue of the tensile stressing outweighs said tensile force and the drum is rotated in winding direction by virtue of the return force of the torsion spring, in particular or preferably being rotated automatically, and thus the line and/or line guide device is wound on to the drum. It has been found that a high torque can also be transmitted by the torsion spring, which is advantageous in order to drive a drum with a high inertia weight in the return movement, with the spring being of a small structural volume. It will be appreciated that a releasable arresting mechanism can be provided, which arrests the drum in a rotary position assumed under the action of the above-mentioned tensile force, and the return of the drum by the return force of said tension spring causes automatic rotation of the drum in the winding take-up direction only when the arresting mechanism is released. Such an arresting mechanism for the drum however may also not be provided.

The configuration according to the invention of the drive device in the form of a torsion spring has various advantages. Thus the drive device is operable without additional devices like for example a media connection for operating the drive device like a power connection. In addition the torsion spring takes up only a small amount of structural space, which in practice does not change or changes only slightly when the torsion spring is put under torsion so that the winding drum together with the torsion spring is of a particularly compact and space-saving configuration. A torsion spring can thus be integrated in the drum in a particularly simple fashion, for example in the body thereof, on which the line and/or the line guide device is wound or from which it is unwound. In addition a torsion spring suffers relatively slight material fatigue and therefore requires only slight or practically no maintenance. In addition such a torsion spring can be easily made at least partially or completely from non-ferritic and/or non-metallic and/or non-magnetic (including non-magnetisable) material which does not interfere with electrical, magnetic and/or electromagnetic fields in the surroundings. In the simplest case such a torsion spring is in the form of an elastically twistable bar or group of bars, wherein the material which is subjected to the torsional stress preferably includes or represents an organic polymer like for example a rubber material.

In general terms in accordance with the invention the following expressions are interpreted as follows: the "drum" is always interpreted as a "winding or take-up drum", "rotation of the drum" is always interpreted as "rotation of the drum about its longitudinal axis". The term "spring" is always intended as "torsion spring". The term "at least one line and/or at least one line guide device" which can be wound on to and/or unwound from the drum or which is wound on to and/or unwound from the drum in operation thereof, preferably in a situation involving unwinding with the exertion of a tensile force on the drum, is possibly abbreviated to read "a line and/or a line guide device" or "at least one line guide device" or "a line guide device". That applies in each case insofar as the context in detail does not indicate something different.

The description relating to the configuration of the torsion spring or parts thereof in connection with the drum are also to be interpreted generally in accordance with the invention independently of the drum insofar as the context in detail does not indicate something different. The description relating to the configuration of the torsion spring or parts thereof independently of the drum are also to be interpreted generally in accordance with the invention in connection with the configuration of the drum with torsion spring insofar as the context in detail does not indicate something different.

The line guide device has an internal space which can accommodate at least one or preferably a plurality of lines like cables or hoses. A change in position of the line transversely relative to the longitudinal direction of its extent is limited by the line guide device. The line guide device is preferably flexible in at least two directions transversely or perpendicularly to its longitudinal extent or has portions which are variable in position relative to each other, for example which can be angled, in order to be capable of being wound on to the drum and on the other hand in order to be capable of being transferred with the unwound portion into a more or less straight arrangement.

Preferably the torsion spring has a longitudinal axis, about which the torsion spring is rotated upon rotation of the drum in the winding-on direction to cause twisting of the spring, wherein the longitudinal axis of the torsion spring is arranged parallel or coaxial to the drum longitudinal axis. That provides a structurally particularly compact and structurally particularly simple design configuration.

Preferably the torsion spring is arranged in the body of the drum, wherein the at least one line and/or line guide device can be wound on to and/or unwound from the body or is wound on to and/or unwound from the body. The longitudinal axis of the body is thus coaxial with the longitudinal axis of the drum. This also provides a compact drum configuration as the body which encloses or surrounds the torsion spring can be of a small structural volume or a small diameter as the spring upon torsion thereof only slightly or practically not at all changes its volume.

Preferably the torsion spring is coupled with a (first) end region in torque-transmitting relationship to the winding drum, particularly preferably being coupled or fixed directly to the winding drum. That involves a small amount of space required for the torsion spring as the drive device for rotating the drum about its longitudinal axis and it gives a compact drum configuration with drive device as the torsion spring upon torsion thereof keeps its volume substantially unchanged. In addition that provides a particularly effective and loss-free transmission of torque from the torsion spring to the winding drum and thus also provides for a reliable return movement of the winding drum upon rotation thereof in the winding take-up direction. By virtue of the direct torque-transmitting coupling the twisting rotation of the torsion spring about its longitudinal axis through a given angular range corresponds precisely to the same angular range of the rotation of the winding drum about its longitudinal axis. It will be appreciated that in that case a portion of the torsion spring like for example a first or a second segment thereof, as described hereinafter in relation to the torsion spring, can be directly non-rotatably fixed to a portion of the winding drum. In that respect the first end region of the spring can also be coupled to a component which is fixed or arranged on the drum in non-rotatable or rotationally fixed and/or positionally invariable relationship and rotates upon rotation of the drum about its longitudinal axis together with the drum, like for example a transmission. Possibly, less preferably as more complicated and expensive and less compact the torsion spring can also act on a device with moveable parts, for example a transmission, which transmits the torsional force of the spring to the drum in torque-transmitting relationship.

The second end region of the torsion spring is generally preferably coupled or can be coupled to a device in torque-transmitting relationship, preferably being releasably fixed thereto, in relation to which the drum is rotatable upon rotation thereof in the winding take-up and/or unwinding direction, for example a holder of the drum. That coupling region of the device carries the torsional forces produced upon torsional stressing of the spring. The second end region of the spring is preferably coupled stationarily and/or invariably in position to said device, preferably being releasably fixed thereto.

Preferably the line and/or the line guide device has a second free end region which is provided with fixing means for coupling to an entrainment member on an apparatus, the entrainment member being moveable relative to the drum, or wherein the fixing means of the second end region of the line and/or line guide device couple to an entrainment member of an apparatus, that is moveable relative to the drum. Upon displacement of the entrainment member in spacing relationship from the longitudinal axis of the winding drum the entrainment member exerts a tensile force on the line and/or line guide device and the winding drum is rotated in the unwinding direction and at the same time the torsion spring is stressed in torsion thereof. The first end region of the line and/or line guide device is in that case preferably fixed in torque-transmitting relationship and/or stationarily to the drum, preferably the body thereof.

The torsion spring preferably at least substantially or completely comprises organic polymer materials like for example organic plastic material and/or organic elastomer like rubber materials, for example a natural and/or synthetic rubber material or the like. The expression "at least substantially comprise" in this context and generally in accordance with the invention is used to mean that the respective component comprises a proportion by weight of >50% or >65%, preferably >80% or >90%, in particular >95% of the respective material. That can respectively be independently of each other for elastically twistable and/or stretchable components of the torsion spring like at least one or more or all spring elements which preferably at least substantially or completely comprise an organic elastomer (polymer elastomer). That can apply independently or in combination therewith for at least substantially rigid components of the torsion spring like in particular a main body of the torsion spring, which preferably at least substantially or completely comprise organic plastic material. It will be appreciated that the respective organic polymer material can preferably contain fillers which are uniformly distributed therein (in particular fillers in particle form), which are to be associated with the weight proportion of the organic polymer material. Alternatively, in the narrower sense, the fillers are not associated with the respective organic polymer material. A torsion spring with a high return force and of small structural volume and low weight for the spring and with a large maximum torsional angle can be provided using such materials. The torsion spring can thereby be used in particular in spaces or on apparatuses, in particular also for driving a winding drum, in or at which the regular operation thereof could otherwise be disturbed by the presence of ferritic material (for example a steel with proportions of a ferritic phase), metallic or magnetic material. Such apparatuses can be for example apparatuses which can receive and/or emit electromagnetic and/or magnetic resonance-based measurement and/or control signals like for example magnetic resonance testing devices like magnetic resonance scanners (MRI scanners). Attention is directed to the further description relating to the torsion spring.

The torsion spring overall preferably contains to a weight proportion of <50% or <25%, preferably <10% or <5%, in particular <2% or preferably no metallic and/or magnetic materials, wherein the latter are ferromagnetic and/or ferrimagnetic materials, preferably including permanently magnetisable materials.

Particularly preferably the winding drum is rotatable by >1 revolution (1 revolution is equal to 360°) about its longitudinal axis with torsional stressing of the torsion spring, particularly preferably by >1.5 revolutions or >3 revolutions, for example >5 or >10 revolutions or more. A corresponding consideration thus also applies for a twisting rotation of the torsion spring about its longitudinal axis. In that way therefore the winding drum can be rotated by at least one revolution or more about its longitudinal axis with stressing of the torsion spring and it can thus also be rotated about its longitudinal axis in the winding take-up direction with stress relief of the torsion spring by the return force exerted on the winding drum by the torsion spring. As a result a relatively great length of a line and/or line guide device can be unwound from the drum with torsional stressing of the torsion spring and by virtue of the return force produced by the torsion spring and by stressing relief thereof it can be automatically wound on to the drum again. A torsion spring is particularly advantageously used for that purpose as at the same time it is of a small structural volume which changes only slightly or practically not at all in the at least one or more revolutions thereof.

Preferably the torsion spring is arranged completely in the winding drum, in particular in the body thereof, about which the at least one line and/or line guide device is wound up or unwound. That provides a compact and in addition also low-maintenance structure, in addition that provides that the spring is shielded by the body in relation to the surroundings and thus also the action of foreign substances like dust or the like. At least one or both of the end regions of the drum body can be provided with a cover element to shield the body interior in relation to the external surroundings. The torsion spring can possibly be coupled to such a cover element in order to transmit a torque to the drum upon torsional stressing of the torsion spring.

Preferably the winding drum has at least one longitudinal region, on which a line and/or line guide device can be wound and/or unwound or at least is partially wound thereon, and a second longitudinal portion at which there is arranged a line and/or line guide device which connects the line and/or line guide device of the first longitudinal portion to an external media source like for example a source for electric power, a fluid, a pressure, information data or the like or which is adapted for connection thereto. The torsion spring extends at least partially over the first and/or the second longitudinal portion of the drum, preferably at least partially over both longitudinal portions. The torsion spring preferably extends completely over the first and/or the second longitudinal portions of the drum. The torsion spring can thereby be of a comparatively great length and in that way can be twisted through a large torsional angle whereby the winding drum can perform a rotation about its longitudinal axis over a greater angular range and thus wind up and/or unwind a great length of line and/or line device, in particular in the first drum longitudinal portion, which is often advantageous. The line and/or line guide device at the second longitudinal portion of the drum can in particular include two portions which are wound with at least one or more turns on the one hand in the clockwise direction and on the other hand in the anti-clockwise direction about the body of the drum, starting from a given direction of view in coaxial relationship with the longitudinal axis of the drum, wherein the two portions of the line guide device are connected together with a direction-changing region of preferably 180°. Such a line guide device is known for example from WO 2011/086198 A2, the disclosed content of which is hereby incorporated in its full entirety.

In the simplest case the torsion spring can be in the form of an elastically twistable bar-shaped element which is twisted about its longitudinal axis, or it can be in the form of a group of such elements. Such a design configuration is structurally particularly simple but suffers from the disadvantage that torsional stressing of the torsion element gives rise to high material loadings which limit the service life of the torsion spring because of material fatigue phenomena. That is the case in particular if the torsion spring is twisted through more than 1 revolution about its longitudinal axis in operation thereof.

Described hereinafter is a particularly advantageous torsion spring which can be advantageously used in combination with a drum as described hereinbefore.

Preferably the torsion spring has an elongate main body having a longitudinal axis, wherein the main body includes at least a first and a second segment which are rotatable relative to each other about the longitudinal axis of the main body. In addition there is provided at least one elastically stretchable spring element coupled to both segments in such a way that upon rotation of the two segments relative to each other about the longitudinal axis of the main body the elastically stretchable spring element experiences a reversible change in length. The configuration of the spring is such that upon torsion of the spring the two segments are rotated relative to each other about the longitudinal axis of the main body and the elastically stretchable spring element experiences a reversible change in length. Such a torsion spring is particularly low-maintenance and durable as the spring element is loaded more or predominantly with stretching in respect of its length instead of in respect of torsion, which gives rise to a lower level of material fatigue. That is the case in particular when the torsion spring is twisted through 1 revolution or more, corresponding to the revolution of the drum, as stated hereinbefore.

The stretchable spring element is designed such that upon twisting of the torsion spring it experiences a length stretch of >25% or >50% or >75% or >100% or >200%, and the stressing force of the torsion spring is applied. The increase in length is measured along the extent of the spring element. The length stretching effect is measured starting from an initial torsion state in which the spring element is of a minimum length or the spring has a minimum torsional stress, but the spring element is arranged straight.

When the torsion spring is subjected to torsion the length thereof preferably generally does not change or changes only slightly, in particular only by a smaller amount than the change in length of the spring element upon torsion through a predetermined angle. That therefore also applies to the spacing of the two coupling regions of the oppositely disposed end regions of the at least one spring element at the two segments, that is to say the first and second segments, in the spring longitudinal direction. The coupling regions can also be of a substantially punctiform configuration. The change in length of the torsion spring upon torsional stressing thereof is preferably <25% or <10% or <5% or <2% or practically 0% at the given torsion of the spring, which corresponds to the above-described rotation of the drum, that is to say for example at 1 or at 5 or at 10 torsional revolutions of the spring or at the maximum number of revolutions in operation of the torsion spring. For that purpose the end regions of the spring elements can engage at least substantially rigid segments which are rotatable relative to each other (that is to say opposite to each other). The spacing of the first segment relative to the second segment in the longitudinal direction of the spring does not change or at least substantially does not change, upon torsional stressing of the spring, in relation to the non-twisted spring, preferably corresponding to the foregoing description relating to the change in length of the spring upon torsional stressing thereof. For that purpose the segments can be mounted or arranged for example at a rigid structural longitudinal axis of the spring and/or can be mounted to each other, wherein upon torsional stressing of the spring those bearing regions are preferably not variable in position in the longitudinal direction of the spring. Upon torsional stressing of the torsion spring the coupling regions of the components coupled in torque-transmitting relationship to the torsion spring like for example winding drum and holding means of the winding drum relative to each other are not subjected to a tensile or compression force relative to each other, which permits a long-lived and low-maintenance design configuration.

Generally in accordance with the invention a "twisted state" of the spring (also "twisted spring") is intended to denote in particular also a state of maximum torsion of the spring. If in relation to the torsion state of the spring there is nothing further stated, then this respectively relates to the spring in the non-twisted state and/or in the twisted state, in particular to the non-twisted state. That respectively applies insofar as the context in detail does not involve anything different.

The at least one spring element preferably couples to the first and/or the second segment of the main body outside the longitudinal axis of the main body, preferably coupling to the two stated segments being effected outside the longitudinal axis of the respective segment, preferably at the outer periphery of the two segments. Coupling is preferably effected with an end region of the spring element to the first and/or second segment. Coupling is preferably effected in rotationally fixed relationship in relation to a torsional stressing of the torsion spring and/or in tensile force-carrying relationship in relation to a direction parallel to the longitudinal axis of the torsion spring. The respective coupling region of the spring element to the respective segment upon torsional stressing of the spring is preferably invariable in position in relation to the longitudinal direction of the spring and/or longitudinal extent of the respective segment and/or invariable in position in relation to the respective segment in the peripheral direction thereof. The torsional stressing of the spring element can thereby be particularly effectively converted into an elastic change in length of the at least one or more spring elements. In that case the longitudinal axis of the segment is preferably coaxial relative to the torsion spring longitudinal axis. By rotation of the first and the second segments of the main body of the torsion spring relative to each other about the longitudinal axis of the main body torsional stressing of the torsion spring is produced. In that way the torsion of the torsion spring is particularly effectively converted into a change in length of the elastically stretchable spring element and the spring element is subjected partially, at least substantially or completely, to a tensile loading upon torsional stressing of the torsion spring, but less of a torsional loading. That provides a particularly durable and low-maintenance torsion spring as a change in length of the spring element is often linked to lower material fatigue phenomena than a torsional loading.

The ratio of the diameter of the segments to the length of the spring main body can be >1:20 or >1:10 or >1:8 or >1:6 so that the coupling regions of the at least one spring element or the spring elements, preferably the end regions thereof, to the segments can have a corresponding radial spacing relative to the longitudinal axis of the main body.

The first and/or the second segment of the torsion spring is/are preferably arranged at opposite end regions of the torsion spring. In that way the torsional stressing of the torsion element can be particularly effectively converted into a change in length of the elastically stretchable spring element. In that way with a given torsion of the torsion element the spring element can be predominantly or at least substantially or practically completely stressed with elastic stretching.

The elastically stretchable spring element, in a non-deformed state or with the spring in the non-twisted state, is preferably in the form of an elongate element which can preferably be arranged in a straight line, for example in the manner of a band, bar or the like. In that way the torsional force which is to be applied upon twisting of the torsion spring can be particularly effectively converted into a tensile force on the spring element in order to cause a change in length of the spring element upon torsional stressing of the torsion spring. The spring element can be of an isometric or a non-isometric cross-section.

Preferably the main body of the torsion spring has at least one or more further segments which is/are respectively arranged in the longitudinal direction of the main body between the first and the second segments, wherein the at least one further segment or the plurality of or all of the further segments is/are rotatable relative to the first and relative to the second segment about the longitudinal axis of the main body. Upon torsional stressing of the torsion spring therefore this preferably also involves rotation of the at least one, plurality of or all of the further segments relative to the first and a second segment. Preferably the at least one spring element couples at least to one or more or all of the further segments at a holding region of the respective further segment. The holding action is preferably effected radially spaced from the longitudinal axis of the respective segment, preferably at the outer periphery thereof. The holding action is preferably effected in force-transmitting relationship, with transmission of a torque to the segment about the longitudinal axis thereof when the spring is in an altering torsional state. Holding is preferably effected in such a way that upon torsional stressing of the spring and a change in length of the spring element in the region of the respective further segment in respect of which the spring element is wound around the spring main body with increasing stressing, the spring element exerts a torque on the respective further segment, at which the spring element is held. That torque preferably causes rotation of the further segment about its longitudinal axis. The references to "a further" or "the respective further" segment can respectively relate in particular to a plurality of or all of the further segments. The holding region of the spring element at the respective further segment is preferably disposed outside the longitudinal axis of the torsion spring main body and/or outside the longitudinal axis of the respective segment. The holding region of the respective further segment for holding the spring element thereto is preferably fixed non-rotatably in relation to the peripheral extent of the respective further segment at that segment and/or stationarily in relation to the longitudinal direction of the respective segment, for example being formed integrally on the segment. That provides a better defined spatial arrangement of the spring element in a torsional state of the spring, in particular also relative to a central region of the longitudinal extent of the spring element, wherein the spring element for example upon twisting of the spring can be wound in a coil form around the spring main body. This means that the stressing of the spring element upon torsional stressing of the spring is also more uniformly distributed over the entire length of the spring element. Upon torsional stressing of the spring longitudinal portion of a spring element—or if provided—an adjacent spring element—the portions can come into contact with each other, which by virtue of interactions between the longitudinal portions like for example friction could lead to irregularities in the build-up and/or reduction in the torsional stress upon the change in the torsional state of the spring. In addition the further rotatable segment or segments ensures that, upon torsional stressing of the spring, the spring element which is wound around the spring main body under the tensioning force and the friction produced thereby with the main body does not seize to the main body, which would limit the maximum torsional angle.

The holding region of the respective further segment for the spring element is preferably fixed to the respective further segment preferably non-rotatably in relation to the peripheral extent thereof and is thus also rotated upon rotation of the segment about the longitudinal axis thereof. By virtue of a region, in particular a longitudinal portion, of the spring element being held at that holding region therefore that region of the spring element is also arranged at the respective segment in a pre-defined position with respect to the peripheral extent of the respective segment. Upon rotation of the segment about its longitudinal axis relative to at least one or both segments adjacent to said segment the spring element which is held at the segment holding region thus experiences a stretching of length or change in the longitudinal stretching. Accordingly the position of the central region of the spring element, that is to say in the spacing region between the first and the second segments, is better defined. The change in length of the spring element upon torsional stressing of the spring is thus notionally or functionally broken down into sub-portions which are respectively arranged between the holding regions of adjacent segments, including the fixing regions of the spring element to the first and the second segment. A corresponding breakdown into sub-portions also applies to the preferably coil-shaped wrapping of the spring element about the spring main body when the spring element is coupled in the radial direction outside the longitudinal axis of the spring to the at least one further segment. The windings of the spring element are arranged between the holding regions of the segments which occur in succession in the longitudinal direction of the spring. That provides for more uniform stressing and stress relief of the spring upon torsional stressing thereof and thus also more uniform operation of a winding drum driven by means of the torsion spring. That applies in particular upon torsional stressing of the spring by more than one or by a plurality of twisting revolutions about its longitudinal axis.

Preferably the main body has a plurality of further segments arranged in succession in the longitudinal direction of the main body, preferably >2 or >4 or >6 without being restricted thereto, which are arranged between the first and the second segments of the main body. That affords the above-described advantages of the main body comprising more than two segments, in a particular fashion.

Preferably the at least one spring element extends continuously from the first segment and the at least one or more further segments extend to the second segment. It is also possible to provide a plurality of spring elements which respectively extend only over a part of the provided number of segments and which are arranged in succession in the longitudinal direction of the spring to connect a plurality of or all segments together.

Generally preferably the holding region of the respective segment, in particular the respective further segment, which is disposed between the first and the second segment, embraces the respective spring element laterally at at least one side or at both opposite sides thereof. In one or in both opposite peripheral directions of the segment the spring element is thus held to the holding region upon torsional stressing of the spring. The holding region is preferably of a groove-shaped configuration, wherein the groove preferably extends with a directional component in the longitudinal direction of the spring or parallel to the longitudinal axis thereof, the spring element being arranged region-wise in the holding groove. Upon torsional stressing of the spring therefore the spring element acts in the peripheral direction of the segment on the holding region so that upon torsional stressing of the spring the respective further segment is rotated about the spring longitudinal axis. A given total torsional angle of the spring is thus broken down into sub-regions as between adjacent segments, which permits a uniform change in length of the spring element over its length. In that way even upon torsional stressing of the torsional spring through more than one revolution, that is to say through greater than/equal to 360°, the spring element is in a better defined position on the segment by virtue of its being guided in the holding region. In addition, by virtue of the extent of the spring element in the holding region or regions the longitudinal portions of the spring element, which are wound around the main body upon torsional stressing of the spring, are wound around same and stressed with a shallower pitch height, that is to say rather in a direction perpendicular to the longitudinal axis of the spring, or upon stress relief thereof exerts a torque on the respective segment, which leads to better transmission of force and torque being exerted on the rotatable segments and provides a more uniform return of the torsion spring.

The holding groove or generally the holding region for the spring element preferably respectively extends over a part or only over a part of the longitudinal extent of the respective segment, for example through >2% or >5% or >10% or >20%. The holding groove or the holding region preferably extends through <33% or <50% or <75% or <95% of the longitudinal extent of the respective segment. In that way in the intermediate space between holding regions of adjacent segments, the spring element upon torsional stressing of the spring can be wound around the main body, preferably with at least one or more full-peripheral windings. That can also apply generally in the context of the invention for the coupling or holding region of the at least one spring element at the respective segment, in which upon torsional stressing of the spring the spring element is not wound with a change in angular extent around the main body.

Preferably with the non-twisted torsion spring the holding regions arranged at adjacent segments of the torsion spring main body, for the at least one spring element, are spaced from each other in the longitudinal direction of the torsion spring. As a result the spring element can be wound in the intermediate region between holding regions of adjacent segments in the peripheral direction around the respective segment.

The foregoing description relating to the spacing of the holding regions of the further segments for the spring element can preferably also apply to the spacing of a holding region of a further segment relative to the coupling region of the spring element at the first and/or second segment.

The respective at least one, plurality of or all holding regions of the at least one further segment preferably respectively project radially outwardly from the respective segment, to hold the spring element.

Preferably the spring element is held to the respective holding region of the further segment in force-locking and/or positively locking relationship. That can respectively apply in particular in relation to a change in position of the spring element relative to the holding region in the radial direction and/or in the peripheral direction of the respective segment. The held region of the spring element can respectively engage behind an undercut configuration of the respective holding region. That preferably applies for a groove-shaped configuration of the holding region.

Preferably the spring element is length-variably held in the holding region of the respective segment. In that way therefore the spring element can have a change in length in the holding region, when the torsion spring is twisted or the torsional state of the torsion spring is changed. In that way upon torsional stressing of the torsion spring or upon a change in the torsional state of the spring the spring element can experience a relatively uniform change in length over its entire longitudinal extent. In that way greatly different stretching states of the spring element over the entire longitudinal extent thereof upon torsional stressing of the torsion spring are avoided as much as possible and the durability of the torsion spring is enhanced. In addition in that way the respective spring element can be more easily assembled and dismantled. Optionally the spring element however can also be stationarily fixed to the respective holding region, preferably being releasably fixed. Optionally the spring element can also be held invariably in respect of length to the respective holding region, at least with a portion of the spring element, on the holding region.

The at least one, plurality of or all of the spring elements can preferably respectively extend continuously from the first to the second segment, which is structurally simple and advantageous in relation to the loading and force transmission of the respective spring element. The respective spring element can possibly extend from the first and/or second segment only as far as a further segment, in which case then a further spring element extends from the further segment to the other of the two segments of the group of first and second segments, which can respectively also apply to a plurality of spring elements.

Preferably a plurality of spring elements are arranged distributed on the main body in the peripheral direction thereof, preferably being distributed uniformly over the periphery of the spring main body. In that way on the one hand the torsion spring can be easily adapted to different requirements, more specifically for example to set a spring characteristic with the arrangement of a different number of spring elements on the torsion spring. In that way the spring force of the torsion spring can be adjusted by the number of spring elements provided. The spring elements can each be of the same structure but they can also be different from each other, for example in relation to their respective spring characteristic. In addition in that way forces exerted on the main body by the spring elements, upon torsional stressing of the spring, which can be different in particular from the torsional forces of the spring, can be reduced, which reduces the loading on the spring and increases the durability thereof. Thus upon twisting of the spring, the respective spring element often exerts a bending force in the longitudinal direction of the main body by virtue of the stressing of the spring element, for example when the fixing regions of the spring element at the first and second segments are not arranged in one plane. By arranging a plurality of spring elements the forces acting on the main body, which are different from the torsional force, can thereby be distributed more uniformly over the periphery of the main body.

Preferably the at least one or the plurality of spring elements are releasably fixed to the main body with their end regions by means of suitable fixing means, preferably at the first and/or the second segment, preferably being respectively fixed in tensile force-transmitting relationship. In that way the spring elements are particularly easily replaceable and maintenance of the torsion spring is facilitated.

Preferably with elastic stretching of the spring element the first and the second segment are rotatable relative to each other about the longitudinal axis of the main body by >1 revolution (360°) or >2, >3 or preferably >5 or >10 revolutions, corresponding to the revolutions of a winding drum driven by the torsion spring, as described above. In that way a comparatively great length of the respective line and/or line guide device can be wound on the drum with reverse movement and stress relief of the torsion spring. A torsion spring can be particularly advantageously used for that purpose.

Preferably the at least one or plurality of or all spring elements of the torsion spring comprises at least substantially or completely an organic polymer material, in particular an elastomer. Preferably the main body of the torsion spring, in particular the segments thereof, at least substantially or completely comprises a plastic material, wherein the segments or the spring main body are preferably in the form of at least substantially rigid components and determine the structural stability of the spring upon stressing thereof. Attention is directed to the corresponding foregoing description relating to the winding drum with torsion spring.

Preferably the material of the spring element has an elongation at break of >100%, preferably >150%, particularly preferably >200%. The elongation at break can be up to 400% or more or up to 500% or more, possibly even up to 750% or more. The elongation at break is preferably determined in accordance with DIN 53455, in relation to the version last valid prior to 1 Jan. 2019. In that way the spring element can perform great elastic stretching upon torsional stressing of the torsion spring, whereby the torsion spring is rotatable through a comparatively large rotational angle and therewith also the winding drum. That is advantageous for many situations of use in which relatively great lengths of the line and/or line guide device are to be wound up and unwound.

Preferably the segments of the torsion spring, preferably all segments thereof, are arranged rotatably relative to each other on a structural axis, wherein the axis in that respect serves as a mounting for the segments upon rotation thereof and the axis is preferably arranged coaxially relative to the longitudinal axis of the spring main body. The segments are preferably arranged in play-free relationship with respect to a change in position transversely or perpendicularly to the axis or at the axis. The segments can generally be arranged in mutually butting relationship in the context of the invention. By virtue of the structural axis the torsion spring has a high mechanical stability, in particular also in relation to forces transversely or perpendicular to the main body longitudinal axis. In that respect however one of the segments, for example the first or the second segment, can be fixed non-rotatably to the structural axis. In that way particularly uniform and exact rotation of the adjacent segments relative to each other about the main body longitudinal axis is ensured upon torsional stressing of the torsion spring and the spring is durable and of low maintenance. Alternatively or additionally the respective segment, preferably all segments, except for possibly an end segment in the longitudinal direction of the spring, can respectively have a mounting region which is introduced in a receiving means of an adjacent segment with a coaxial arrangement of the two adjacent segments relative to each other, wherein the mounting region upon rotation of the two adjacent segments relative to each other provides for a mounting configuration for the two segments to each other. Mounting of the segments to each other is preferably play-free in a direction transversely or perpendicular to the segment longitudinal axis or the main body longitudinal axis.

The invention will be illustrated and described hereinafter by means of an embodiment by way of example. All features of the embodiment are disclosed independently or in combination with each other generally in accordance with the invention. The disclosure of the embodiment also concerns independently of each other the configuration of the torsion spring or the winding drum or the combination of winding drum with torsion spring.

DETAILED DESCRIPTION

FIGS. 1 to 4 show a torsion spring 10 according to the invention which can be particularly advantageously used in combination with a winding drum 1, but also independently thereof.

Figure 5A:
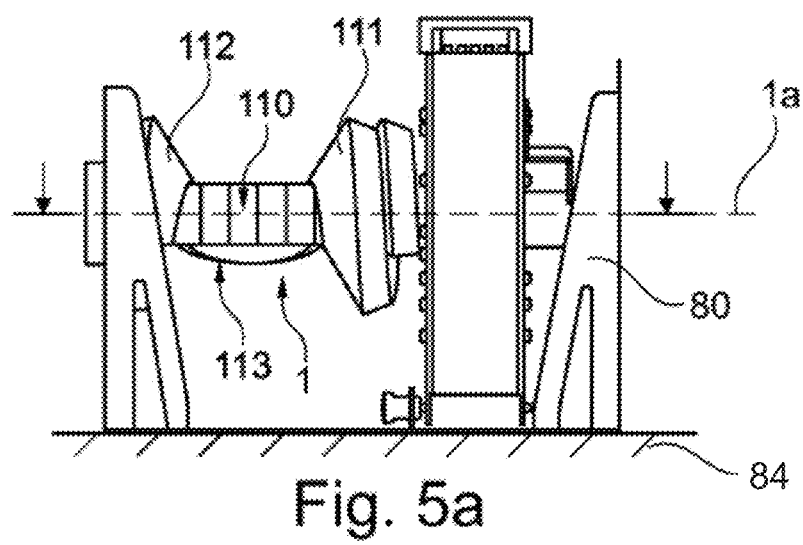
FIGS. 5a-5f show views of the winding drum with torsion spring, preferably as shown in FIGS. 1 to 4, as a front view (FIG. 5a), a side view (FIG. 5b), a perspective view (FIG. 5c), in cross-section (FIG. 5d), as a detail view of the cross-section (FIG. 5e) and as exploded views (FIG. 5f).
Figure 5B:
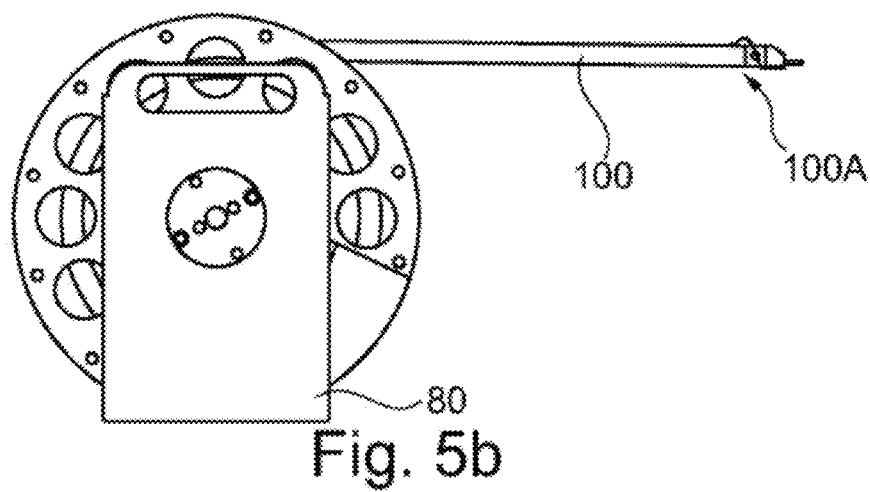
Figure 5C:
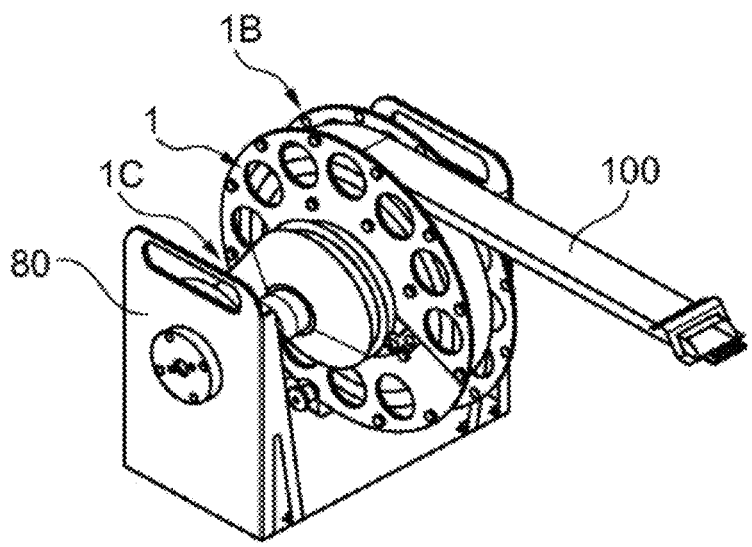
Figure 5D:
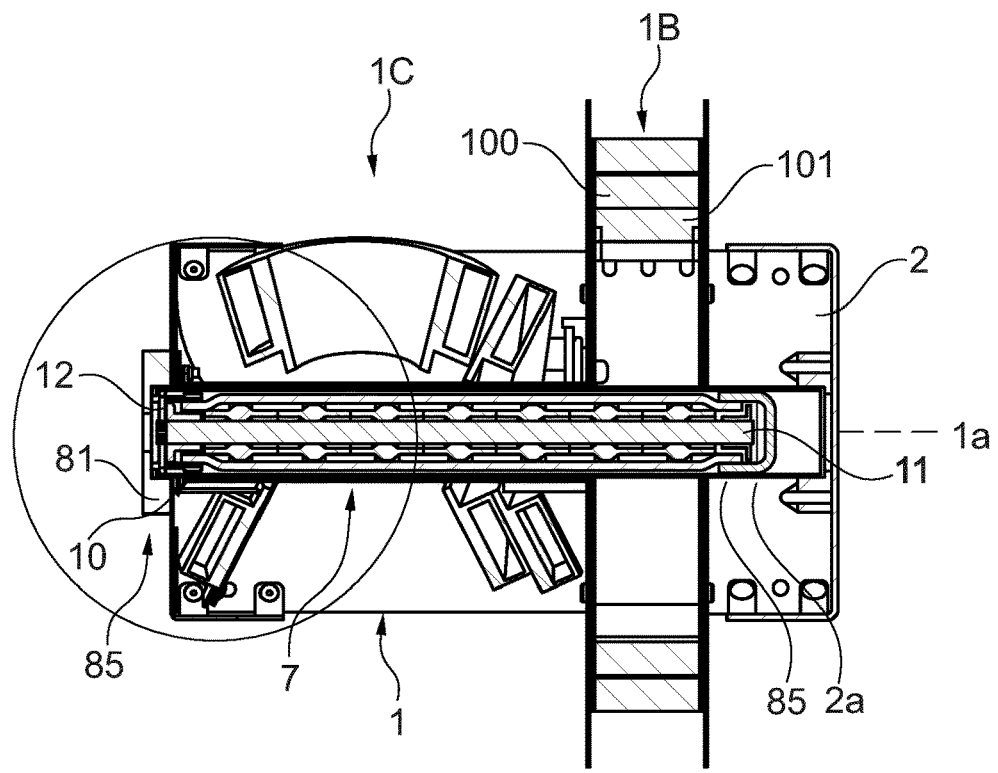

The torsion spring 10, in particular for a winding drum 1 or with a winding drum 1, has an elongate main body 15 having a longitudinal axis 16, wherein the main body includes at least a first and a second segment 21, 22 which are rotatable relative to each other about the main body longitudinal axis 16. In addition there is provided at least one elastically stretchable spring element 30 which is respectively coupled to at least one or both segments 21, 22 of the group of first and second segments at the respective coupling region 32, in particular at both segments 21, 22, and wherein upon rotation of the two segments 21, 22 relative to each other about the longitudinal axis 16 of the main body the elastically stretchable spring element 30 experiences a reversible change in length. The coupling is tensile force-transmitting in the longitudinal direction of the torsion spring 10 (the longitudinal direction of the spring corresponds to the direction in which the main body 15 extends). In addition the coupling is torque-transmitting to the segments 21, 22 upon torsional stressing of the spring 10. For coupling purposes there are provided fixing elements 17 like screws which couplingly fix the end regions 30a of the spring element 30 to the respective segment 21, 22. In the illustrated embodiment there are provided a plurality of such spring elements 30, six in number here, which are arranged distributed uniformly around the periphery of the main body 15. In its non-elastically deformed state the elastically stretchable spring element 30 is in the form of an elongate element, for example in the form of a band or bar. Upon rotation of the two segments 21, 22 relative to each other about the main body longitudinal axis 16 the spring 10 is twisted (arrow, FIG. 4b) and the at least one spring element 30 or generally the spring elements 30 provided at the spring is stressed, and thus the spring is torsionally stressed. Stressing of the spring 10 can be effected by a tensile force being exerted on the line and/or line guide device 100 wound on the drum 1 and thereby same is at least partially or completely unwound from the drum. The line guide device preferably has or can have at least one or more lines in its interior. The stressing force exerts a return moment on the spring 10. If the return moment outweighs the tensile force then as a result with stress relief of the torsion spring 10, the drum 1 is automatically rotated by means of the drive force by the spring in the winding take-up direction (FIG. 5b, arrow) and the line guide device and/or line is automatically wound on to the drum, more specifically with the spring completely relieved of stress, preferably being completely wound on. All statements relating to the at least one spring element 30 also apply in accordance with the illustrated embodiment to all other spring elements 30 of the torsion spring, in which respect however that is generally not mandatory. The plurality of spring elements in the illustrated embodiment are of the same structure, which however is not mandatory.

The main body 15 has at least one further segment which is arranged in the longitudinal direction of the main body 15 between the first and second segments 21, 22, wherein the at least one further segment 23 is rotatable relative to the first and the second segments 21, 22 about the main body longitudinal axis 16. The at least one spring element, at least at one of the further or all of the further segments 23, couples at a holding region 23a thereof, here in torque-transmitting relationship to the further segment or segments upon torsional stressing of the spring. The at least one holding region or the holding regions 23a here are of a significant extent in the longitudinal direction of the segments 23, or >5% or >10% of the segment length in the spring longitudinal direction, for example <75% or <50% thereof, without being restricted thereto, the holding regions can possibly also be of a punctiform configuration. In the illustrated embodiment there are provided a plurality of such further segments, for example more than 2 or 3, here 6. In that way the twisting overall deformation or overall rotation of the respective spring element 30 is distributed to a plurality of portions 35 in the longitudinal direction of the spring, more specifically portions 35 between two holding regions 23a spaced in the spring longitudinal direction, and thereby provides for more uniform torsional stressing and/or stress relief of the spring 1. Here coupling of the spring element to the further segment or segments at the holding regions 23a thereof is effected not in tensile force-transmitting relationship in the longitudinal direction of the torsion spring, which has proven to be advantageous, but which can be the case.

The at least one spring element 30 is coupled in radially spaced relationship from the spring longitudinal axis 10a to the first and/or second segment 21, 22, which preferably applies to both segments. The spring longitudinal axis 10a extends coaxially relative to the main body longitudinal axis 16. The at least one spring element 30 is also arranged spaced radially from the spring longitudinal axis 10a at the first and/or second segment 21, 22 and at least one further segment 23 arranged between the first and second segments, or at all further segments 23, in relation to the further segment or segments, at the respective holding region 23a thereof. That has proven to be advantageous for production of the torsional stressing upon rotation of the segments and for the smoothness of operation of the torsion spring. That can apply generally in accordance with the invention. The ratio of the diameter of the segments to the length of the spring main body is here >1:6.

Here the at least one spring element 30 is arranged in the region of the outer periphery 21a, 22a of the first and/or the second segment 21, 22, here in the region of the outer periphery of both segments 21, 22. The at least one spring element 30 is here arranged in the region of the outer periphery of the first and the second segment 21, 22 and at least one further segment 23 disposed between the first and second segments. That affords the above-mentioned advantages in a particular fashion.

The at least one further segment 23 which is arranged between the first and second segments 21, 22 in the longitudinal direction of the main body longitudinal axis 16 has a holding region 23a for the at least one spring element or, when there are a plurality of spring elements, a plurality of holding regions 23a for same, more specifically a respective holding region 23a for one of the spring elements 30. In that way the position of the spring element is better defined at the spring upon torsional stressing thereof. The further segment 23 here in addition experiences a rotary movement by virtue of its cooperation with the spring element 30 upon torsional stressing of the spring 10, by virtue of the torque-transmitting coupling of the spring element to the respective further segment 23, whereby the extension in length and winding or the position of the spring element 30 upon torsional stressing of the spring is better defined and winding of the spring element is distributed to a plurality of defined longitudinal portions 35. The longitudinal portions 35, which are produced upon torsional stressing of the spring 10 and which are wound around the main body 15, of the at least one or all spring elements, are thus arranged in the longitudinal direction of the spring between the holding regions 23a of the segments 23 and/or between the holding regions 23a and the coupling regions 32 at the first and/or second segment 21, 22, or stated in general terms in the transitional region between two adjacent segments 21, 22, 23. The respective holding region 23a in respect of its directional extent has at least one directional component in the longitudinal direction of the spring, the holding region 23a here being oriented parallel to the longitudinal direction of the spring. In that way upon torsional stressing of the spring 10 the windings of the spring element 30 around the spring main body are arranged more in the peripheral direction of the segment 23 or perpendicularly to the longitudinal direction 10a of the spring, thereby affording better torque transmission of the spring element to the respective segment 23, which improves the properties of the torsion spring upon stress relief thereof. Upon rotation of adjacent segments 23 relative to each other the spring element is held variably in respect of length at the respective holding region 23a, thereby providing a more uniform change in length of the spring element over the length thereof and thus low material loadings when stressing the spring and relieving it of stress. The holding region 23a for the spring element at the respective segment is here in the form of a groove, the spring element being arranged with a region or longitudinal portion thereof in the groove. In this case the spring element engages behind an undercut configuration in the holding region or the holding groove and is thereby held in positively locking relationship in the radial direction. Optionally however the spring element with a longitudinal portion may also be coupled to the respective segment in such a way as not to be variable in length. When there are a plurality of holding regions 23a the foregoing description correspondingly applies thereto.

A plurality of spring elements 30, here six, are arranged on the main body 15 distributed in the peripheral direction thereof, whereby on the one hand the spring force of the spring 10 is increased while on the other hand that provides for more uniform force distribution about the periphery of the spring upon torsional stressing thereof.

Figure 4A:
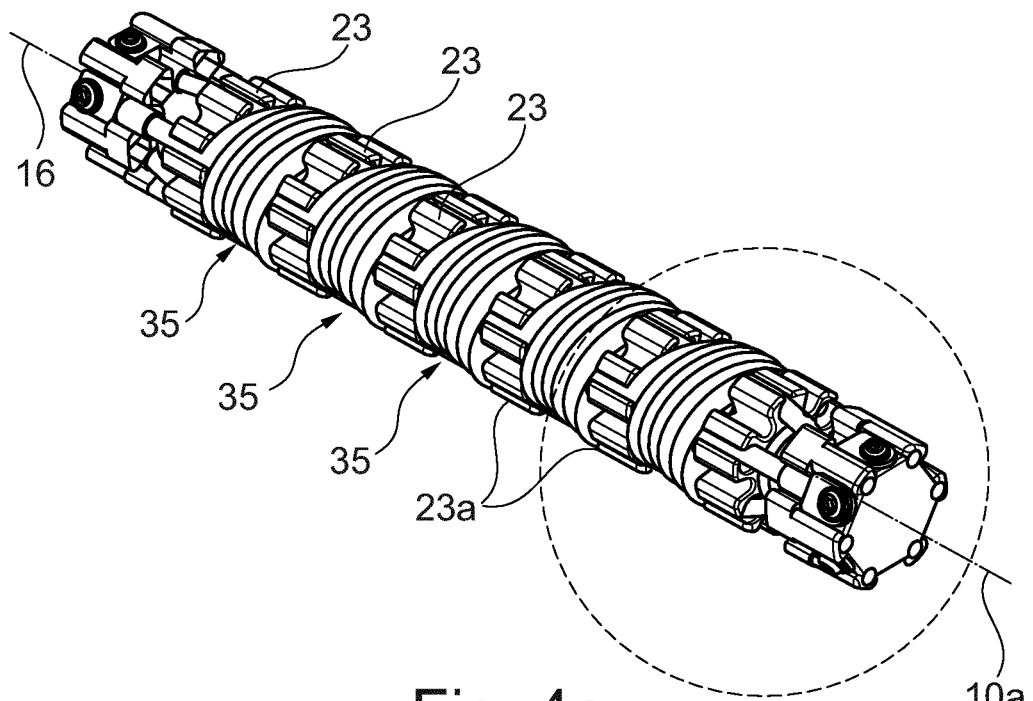
FIGS. 4a and 4b show views of a torsion spring according to the invention as shown in FIG. 3 in the twisted state as a perspective overall view (FIG. 4a) and as a detail view (FIG. 4b)
Figure 4B:
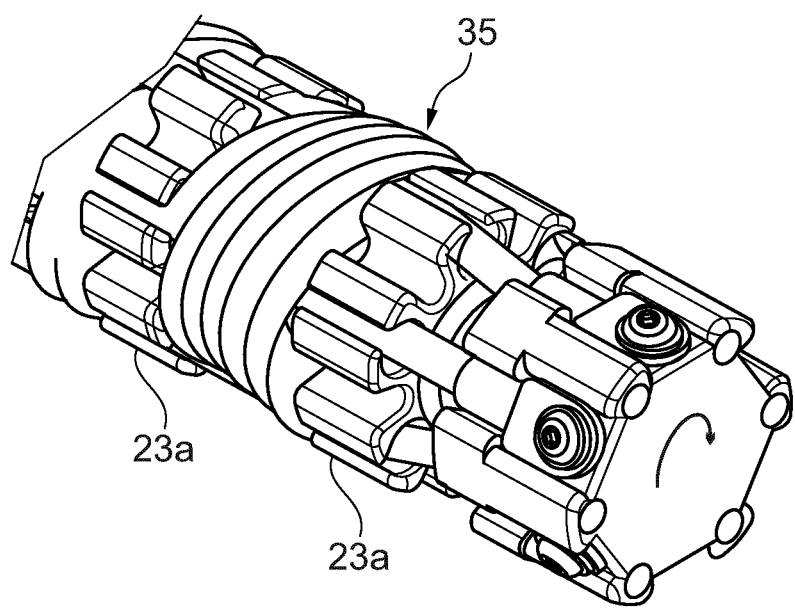

The spring element or elements are here designed in such a way that, with elastic stretching of the spring element, the first and the second segments 21, 22 are rotatable by >1 revolution (that is to say >360°), or >3 revolutions, here about 20 revolutions or more, about the longitudinal axis of the main body relative to each other, as shown in FIG. 4a distributed to the five twisted regions 35. As a result for example a drum 1 driven by the spring 10 in the winding take-up direction is rotatable by a corresponding number of revolutions and thus a line and/or line guide device 100 arranged at the drum can be wound up and unwound by a great length. It will be appreciated that in the torsional starting state of the drum (torsional angle equal to 0°) the spring element or elements 30 are arranged tautly in the longitudinal direction of the spring 10 or are coupled with a certain low tensile stressing to the two segments of the first and second segments. With a slight torsional effect for the spring starting from the initial state thereof with a rotary angle of 0° therefore a return force is already exerted on the two specified segments in the direction of the return movement to the initial state.

The material of the spring element 30 has an elongation at break of at least 150% in accordance with DIN 53455, here for example 400% or 600%. It will appreciated that the elongation at break is adapted to the number of revolutions of the spring upon torsional stressing thereof.

Figure 1:
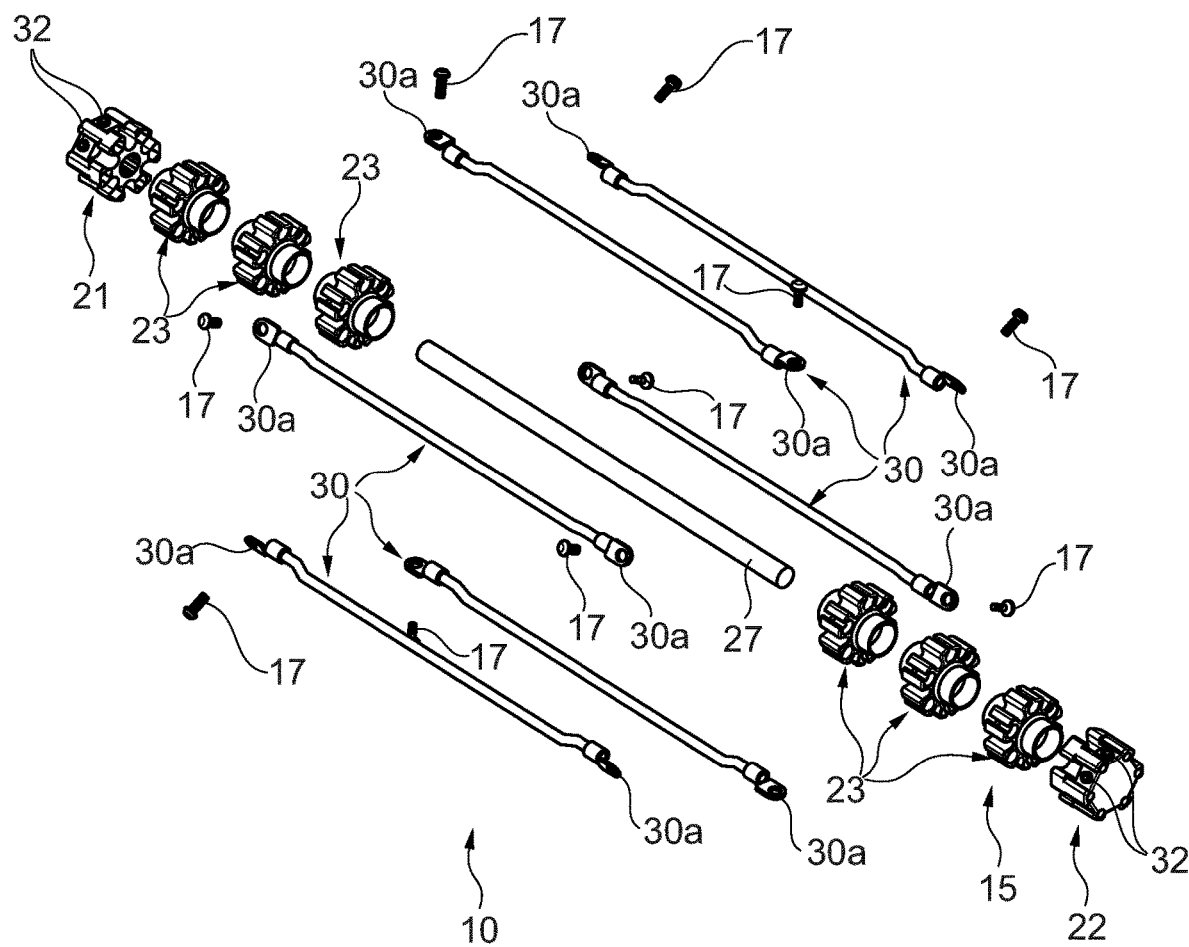
FIG. 1 shows an exploded view of a torsion spring according to the invention.
Figure 2A:
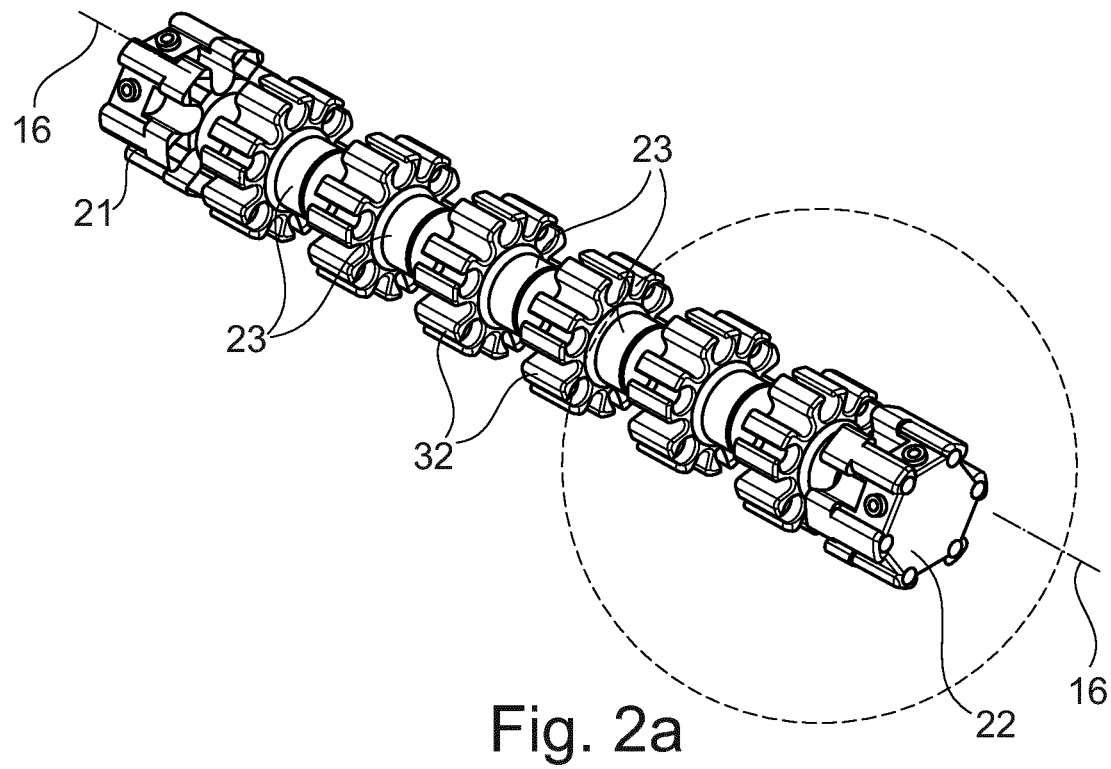
FIGS. 2a and 2b show perspective views of a torsion spring according to the invention as shown in FIG. 1 without spring elements in the overall view (FIG. 2a) and as a detail view (FIG. 2b)
Figure 2B:
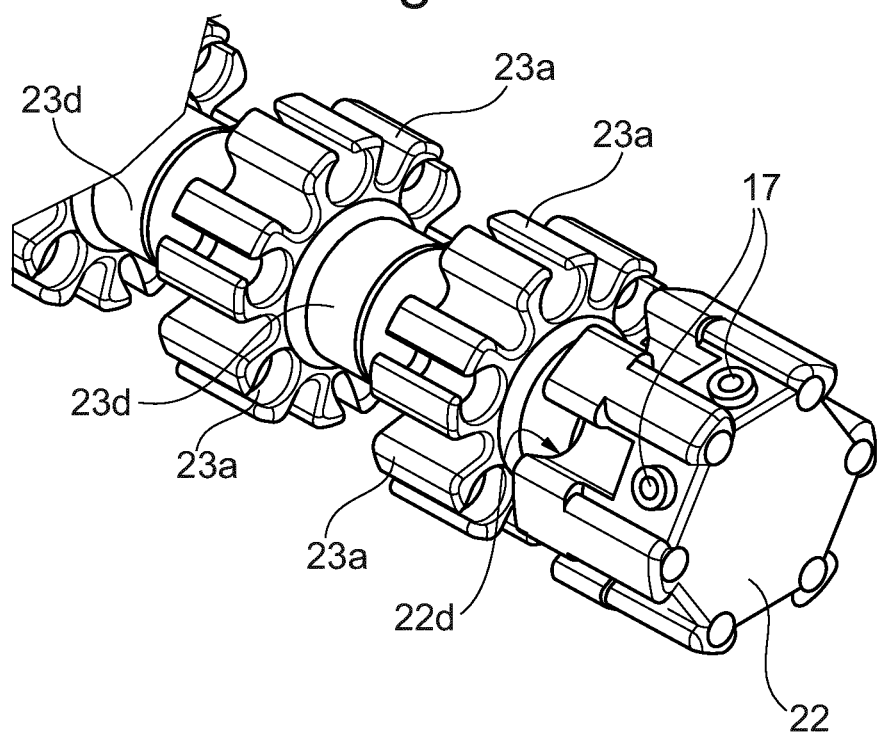
Figure 3A:
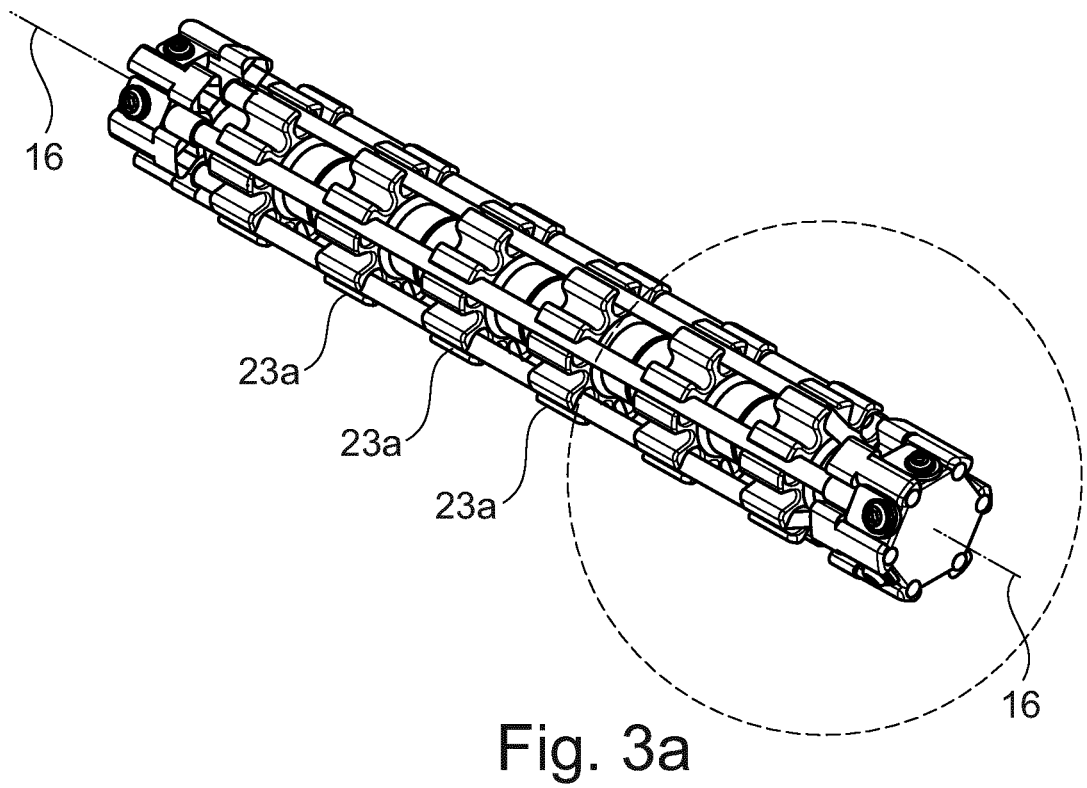
FIGS. 3a and 3b show overall views of the torsion spring according to the invention as shown in FIG. 1 with the at least one spring element in the non-twisted starting state (FIG. 3a) and as a detail view (FIG. 3b)
Figure 3B:
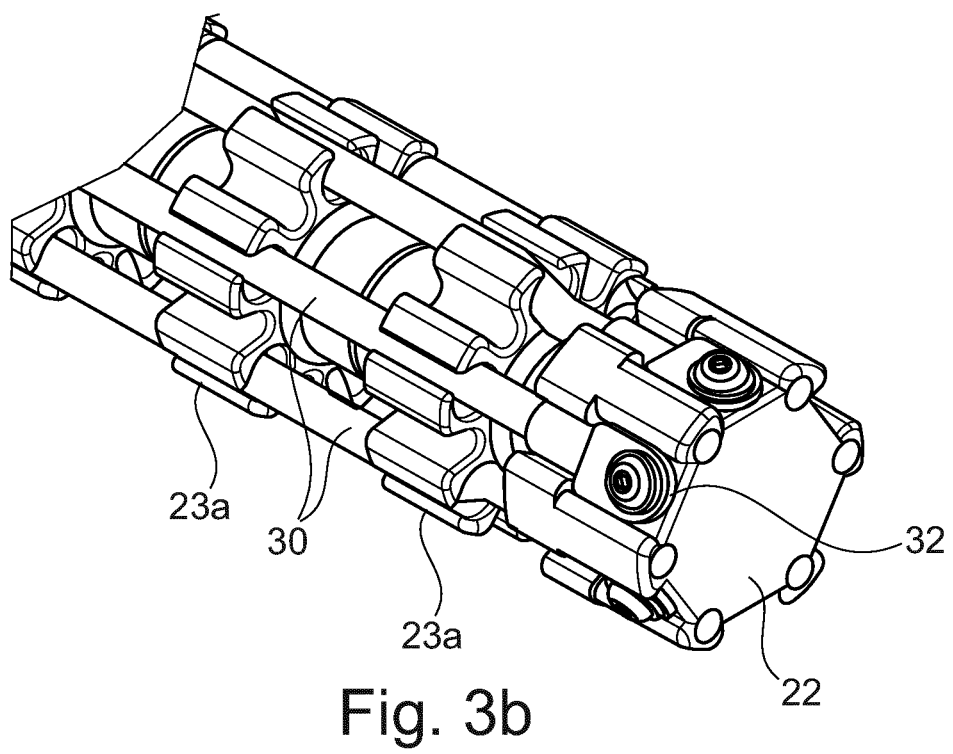
Figure 5E:
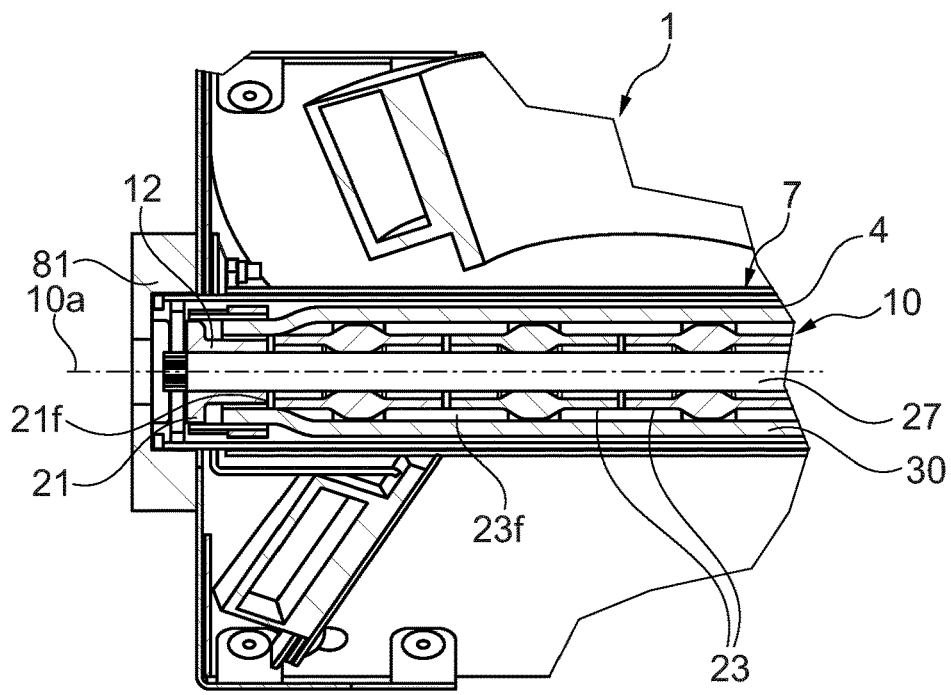
Figure 5F:
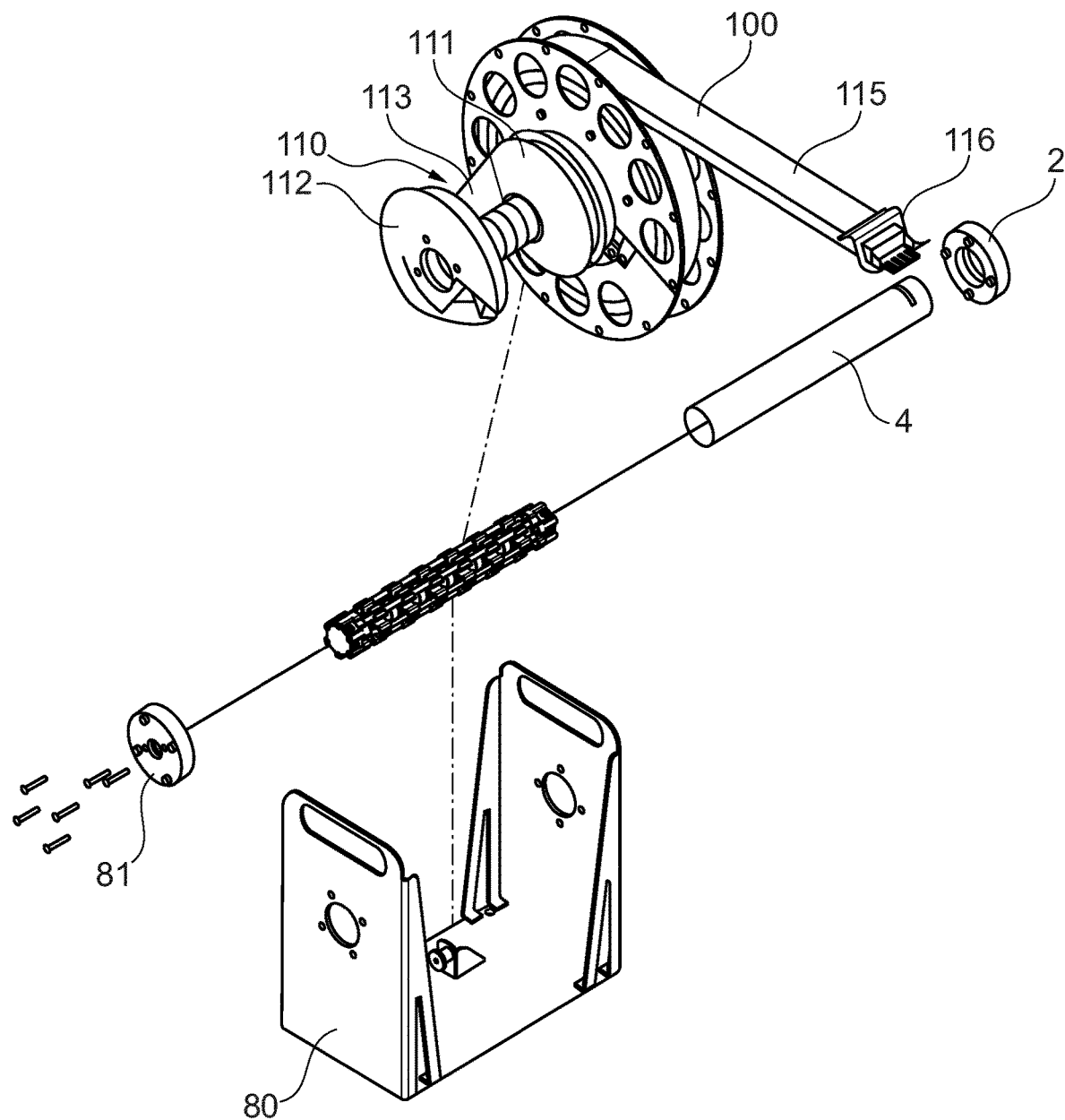

The second segment 22 and/or a or the further segments 23 which are possibly arranged between the first and second segments can respectively have a bearing region 22d, 23d which can be introduced into a receiving means (not shown) of an adjacent segment with a coaxial arrangement of the two adjacent segments relative to each other, wherein the bearing region permits rotation of the two adjacent segments relative to each other. The bearing region can be for example a cylindrical end portion (not shown) of the segment 22, 23, which engages into a receiving means (not shown) of the adjacent segment. Alternatively or additionally as shown in FIG. 1 the segments 21, 22, 23 can be arranged on a structural axis 27 rotatably relative to each other and rotatably relative to the structural axis 27, the latter as far as preferably one of the segments, for example the first segment 21, wherein the structural axis 27 can at least substantially determine the stability of the spring main body 15 and at the same time can serve as a bearing means for the segments upon rotation of the segments 22, 23 relative to each other. The segments 22, 23 which are rotatable relative to the axis 27 are arranged here in play-free relationship in a direction transverse to the axis, at the axis 27. In this case the segments 21, 22, 23 can bear against each other with their end faces 21f, 23f (FIG. 5e).

The torsion spring 10 comprises at least substantially or completely an organic polymer material, wherein the respective polymer material of the individual components of the spring contains fillers. The spring main body 15, more specifically the segments 21, 22, 23 thereof, which here are at least substantially rigid or are rigid, in this case comprise a plastic material, being produced here using an injection moulding method, which however is not mandatory. The spring elements 30 comprise an organic elastomer which contains fillers. The fillers are respectively organic fillers, including carbon like for example carbon black, but no metallic or magnetic materials. The torsion spring can thereby be advantageously used for example on MRI equipment.

The torsion spring is here used as a drive device for a winding drum, see FIG. 5.

FIG. 5 shows a winding drum 1 for at least one line and/or for at least one line guide device 100. the drum 1 is provided with a torsion spring according to the invention as its drive device, but can possibly also be used with torsion springs of a different construction.

The winding drum 1 is equipped with a line guide device 100, alternatively or additionally also with a line, or is adapted for being equipped with a line guide device and/or line. Arranged in the internal space 101 of the line guide device 100 are at least one or a plurality of lines, or the internal space is designed for that purpose. The drum 1 is shown here by way of example in a state in which the line guide device 100 is partially unwound from the drum.

The winding drum 1 is mounted to a holder 80 rotatably about the drum longitudinal axis and is appropriately supported. The holder 80 can be fixed to the support surface 84 stationarily and invariably in position. A first end region 101 of the line and/or line guide device is or can be fixed to the drum and by rotation of the drum in a winding take-up direction and an unwinding direction (FIG. 5b, arrows) about the drum longitudinal axis the line and/or line guide device can be wound on to and unwound from the drum. There is also a drive device engaging the winding drum in order, upon rotation of the drum in its unwinding direction, to exert a return force on the drum for rotation thereof in its winding take-up direction. The drive device is here in the form of the torsion spring 10 which upon rotation of the drum 1 in the unwinding direction is subjected to torsional stress and by virtue of the torsional stress exerts a torque or a return force on the drum 1 for rotation thereof in the winding take-up direction so that, by means of the return force, the drum 1 can be moved into its initial position with the line guide device and/or line completely wound thereon. The torsion spring 10 has a longitudinal axis 10a about which the torsion spring is twistingly rotated upon rotation of the drum in the winding take-up direction. The torsional spring longitudinal axis 10a is arranged parallel or coaxial with the drum longitudinal axis 1a. The torsion spring 10 is coupled with an end region 11 preferably directly in torque-transmitting relationship to the winding drum 1. For that purpose a coupling portion 2 in the form for example of a flange is provided as part of the drum, which on the one hand is coupled non-rotatably and in torque-transmitting relationship with a coupling region 2a to an end region 11 of the spring, and on the other hand to the drum. The opposite end region 12 of the spring is coupled in torque-transmitting relationship to the holder 80 or another device, in relation to which the drum is rotatable, the flange 81 being provided for that purpose here. Here the spring is arranged in a sleeve 4 which at the same time protects the spring from external influences and facilitates fixing of the spring to the drum or generally the apparatus. The sleeve 4 is non-rotatably connected to the spring 10 and one of the two components of the coupling portion 2 and the flange 81, in which case the sleeve 4 is mounted rotatably at the holder 80, for example the flange 81. The sleeve 4 can be guided in a hollow shaft 7 of the drum 1, wherein the hollow shaft 7 can be part of the drum body, thereby affording an arrangement which is supported in stable fashion and is advantageous for torque transmission. The winding drum 1 is rotatable through >1 or >5 revolutions, here for example 20 revolutions, about its longitudinal axis, with torsional stressing of the torsion spring.

The line and/or the line guide device 100 here has a second end region 115 which is provided with fixing and/or coupling means 116 for coupling to an entrainment member (not shown) of an apparatus, that is moveable relative to the drum, or which couple thereto. In that way a tensile force can be exerted on the line guide device and/or line in order to unwind same from the drum. Independently thereof the coupling means serve for media-transmitting coupling of at least one line, which is preferably received by the line guide device 100 for supplying the apparatus.

The torsion spring 10 at least substantially or completely comprises organic polymer material which can contain fillers, as stated hereinbefore. The substantially rigid segments 23 of the spring here comprise an organic plastic material and can be produced for example using an injection moulding method. The spring element or here the spring elements of the spring comprise an organic elastomer.

The drum has a first longitudinal portion 1B, at which the line guide device 100 is arranged and about which it can be wound on and/or unwound. The drum 1 further has a second longitudinal portion 1C, at which there is provided a device for connecting the line arranged in the line guide device 100 or the line per se to a suitable media source in order to supply the apparatus which is connected to the line guide device 100 in media-transmitting relationship and which has a consumer for the medium. The medium can be an energy medium like power, a fluid, including liquid, gas or the like, or also a data stream. The device here is in the form of a line guide device 110 with a line arranged thereby, preferably in the interior thereof. The line guide device 110 or generally the device here has a first length portion 111 which in a first direction of revolution is wound around the body 5 of the drum 1, a further length portion 113 which in an opposite direction is wound around the drum body 5, and a transitional region 112 between the two length portions 111 and 113, the connecting portion 112 representing a direction-changing region for connecting the portions 111 and 113 together, preferably with a deflection through 180°. A line guide device of that kind is described for example in WO 2011/086198, the disclosed content of which is hereby incorporated to its full extent. The drum has a bearing 85 which supports the drum rotatably about the longitudinal axis 1A thereof. The bearing is here provided by the hollow shaft 7 or in some other fashion. The torsion spring 10 is arranged within the hollow shaft 7 or generally in the body 5 of the drum, which includes the drum longitudinal portions 1B, 1C.

Upon unwinding of the line or line guide device 100, for example if a tensile force is exerted on the free end 100A of the line or line guide device, the line or line guide device is unwound from the drum with rotation of the drum about its longitudinal axis and in that case the torsion spring is subjected to torsional stressing. The rotational movement of the drum 1 upon rotation thereof in the unwinding direction is thus transmitted to the torsion spring 10 by means of the coupling portion 2. When the tensile force on the line or line guide device 100 ceases and the return force of the torsion spring predominates over the tensile force then the line or line guide device is wound on to the drum with rotation of the drum in its winding take-up direction.

What is claimed is:

1. A torsion spring for a winding drum, comprising:
   an elongated main body having a longitudinal axis, the elongated main body includes at least a first segment and a second segment which are rotatable relative to each other about the elongated main body longitudinal axis,
   wherein the first segment and the second segment are arranged at opposite end regions of the torsion spring,
   wherein there is provided at least one elastically stretchable spring element,
   wherein the at least one elastically stretchable spring element is in a form of an elongated element in its non-deformed state and the at least one elastically stretchable spring element has a first end region and a second end region, the first end region and the second end region being provided at opposite ends of the at least one elastically stretchable spring element,
   wherein the first end region of the at least one elastically stretchable spring element is provided with a first coupling region that is fixed to the first segment of the elongated main body by a first fixing element and the second end region of the at least one elastically stretchable spring element is provided with a second coupling region that is fixed to the second segment of the elongated main body by a second fixing element,
   wherein the at least one elastically stretchable spring element couples to the first segment and/or to the second segment of the elongated main body outside the longitudinal axis of the elongated main body, and
   wherein upon rotation of the first segment and the second segment of the elongated main body relative to each other about the longitudinal axis of the elongated main body, the at least one elastically stretchable spring element is wound around the elongated main body and the at least one elastically stretchable spring element experiences a reversible elongation of the elongated element around the elongated main body.

2. The torsion spring according to claim 1, wherein the torsion spring is disposed as a drive device for a winding drum for a line and/or for a line guide device which is adapted to receive and guide at least one line, wherein the winding drum is rotatable about the longitudinal axis thereof, wherein a first end region of the line and/or line guide device is or can be fixed to the winding drum and by rotation of the winding drum in a winding-on and an unwinding direction about the winding drum longitudinal axis the line and/or line guide device can be wound on to and unwound from the winding drum, wherein the torsion spring engages the winding drum in order upon rotation of the winding drum in the unwinding direction thereof to exert a return force on the winding drum for rotation thereof in the winding-on direction, wherein the torsion spring, upon rotation of the winding drum in the unwinding direction, is subjected to torsional stress and by virtue of the torsional stress exerts a torque on the winding drum for rotation thereof in the winding-on direction and the torsional stress exerts the return force on the winding drum.

3. The torsion spring according to claim 2, wherein the torsion spring has a longitudinal axis about which the torsion spring is twistingly rotated upon rotation of the winding drum in the winding-on direction and the torsion spring longitudinal axis is arranged parallel or coaxially to the winding drum longitudinal axis.

4. The torsion spring according to claim 2, wherein the torsion spring is coupled with an end region to the winding drum or wherein the torsion spring is coupled with an end region to the winding drum in directly torque-transmitting relationship.

5. The torsion spring according to claim 2, wherein the line and/or the line guide device has a second end region which is coupleable to an entrainment member of an apparatus, the entrainment member being moveable relative to the winding drum, or wherein the fixing means of the second end region of the line and/or the line guide device couple to an entrainment member of an apparatus, that is moveable relative to the winding drum.

6. The torsion spring according to claim 2, wherein the torsion spring at least substantially or completely comprises organic plastic material and/or organic elastomer.

7. The torsion spring according to claim 2, wherein the winding drum is rotatable about the winding drum longitudinal axis by ≥1 revolution with torsional stressing of the torsion spring.

8. An apparatus comprising a winding drum according to claim 2.

9. The torsion spring according to claim 1, wherein the elongated main body includes at least one further segment arranged in a longitudinal direction of the elongated main body between the first segment and the second segment and the at least one further segment is rotatable about the elongated main body longitudinal axis relative to the first segment and the second segment and that the at least one elastically stretchable spring element couples to the at least one further segment.

10. The torsion spring according to claim 1, wherein the torsion spring has a torsion spring longitudinal axis, and
wherein (i) the at least one elastically stretchable spring element is coupled radially spaced from the torsion spring longitudinal axis to the first segment and/or the second segment, or (ii) the at least one elastically stretchable spring element couples radially spaced from the torsion spring longitudinal axis to the first segment and/or the second segment and at least one further segment arranged between the first segment and the second segment.

11. The torsion spring according to claim 10, wherein (i) the at least one elastically stretchable spring element is arranged in a region of an outer periphery of the first segment and/or the second segment, or (ii) the at least one elastically stretchable spring element is arranged in a region of an outer periphery of the first and/or the second segment and at least one further segment arranged between the first and second segments.

12. The torsion spring according to claim 1, wherein at least one further segment is arranged between the first segment and the second segment in a longitudinal direction of the elongated main body longitudinal axis and has a holding region for the at least one elastically stretchable spring element.

13. The torsion spring according to claim 12, wherein the at least one elastically stretchable spring element is held variably in length in the holding region upon rotation of adjacent segments relative to each other.

14. The torsion spring according to claim 1, wherein the first segment and the second segment each has a holding region of groove-shaped configuration for the at least one elastically stretchable spring element, in which the at least one elastically stretchable spring element is arranged with a region thereof.

15. The torsion spring according to claim 1, wherein a plurality of elastically stretchable spring elements are arranged on the elongated main body distributed in a peripheral direction of the main body.

16. The torsion spring according to claim 1, wherein with elastic stretching of the at least one elastically stretchable spring element, the first segment and the second segment are rotatable relative to each other by ≥1 revolution about the longitudinal axis of the elongated main body.

17. The torsion spring according to claim 1, wherein the material of the at least one elastically stretchable spring element has an elongation at break of at least 150%.

18. The torsion spring according to claim 1, wherein the torsion spring at least substantially or completely comprises organic plastic material and/or organic elastomer.

19. A torsion spring for a winding drum, comprising:
an elongated main body having a longitudinal axis, the elongated main body includes at least a first segment and a second segment which are rotatable relative to each other about the elongated main body longitudinal axis,
wherein the first segment and the second segment are arranged at opposite end regions of the torsion spring,
wherein there is provided at least one elastically stretchable spring element,
wherein the at least one elastically stretchable spring element is in a form of an elongated element in its non-deformed state and the at least one elastically stretchable spring element has a first end region and a second end region, the first end region and the second end region being provided at opposite ends of the at least one elastically stretchable spring element,
wherein the first end region of the at least one elastically stretchable spring element is provided with a first coupling region that is fixed to the first segment of the elongated main body by a first fixing element and the second end region of the at least one elastically stretchable spring element is provided with a second coupling region that is fixed to the second segment of the elongated main body by a second fixing element,
wherein the at least one elastically stretchable spring element couples to the first segment and/or to the second segment of the elongated main body outside the longitudinal axis of the elongated main body, and
wherein upon rotation of the first segment and the second segment of the elongated main body relative to each other about the longitudinal axis of the elongated main body, the at least one elastically stretchable spring element is wound around the elongated main body and the at least one elastically stretchable spring element experiences a reversible elongation.

20. A torsion spring for a winding drum, comprising:
an elongated main body having a longitudinal axis, the elongated main body includes at least a first segment and a second segment which are rotatable relative to each other about the elongated main body longitudinal axis,
wherein the first segment and the second segment are arranged at opposite end regions of the torsion spring,
wherein there is provided at least one elastically stretchable spring element,
wherein the at least one elastically stretchable spring element is in a form of an elongated element in its non-deformed state and the at least one elastically stretchable spring element has a first end region and a second end region, the first end region and the second end region being provided at opposite ends of the at least one elastically stretchable spring element,
wherein the first end region of the at least one elastically stretchable spring element is provided with a first coupling region that is fixed to the first segment of the elongated main body by a first fixing element and the second end region of the at least one elastically stretchable spring element is provided with a second coupling region that is fixed to the second segment of the elongated main body by a second fixing element,
wherein the at least one elastically stretchable spring element couples to the first segment and/or to the second segment of the elongated main body outside the longitudinal axis of the elongated main body,
wherein upon torsional stressing of the torsion spring, the first and the second coupling regions of the spring element are essentially invariable in position in relation to a longitudinal direction of the torsion spring, and wherein upon rotation of the first segment and the second segment of the elongated main body relative to each other about the longitudinal axis of the elongated main body, the at least one elastically stretchable spring element is wound around the elongated main body and the at least one elastically stretchable spring element experiences a reversible elongation of the elongated element around the elongated main body.

21. A torsion spring for a winding drum, comprising:

an elongated main body having a longitudinal axis, the elongated main body includes at least a first segment and a second segment which are rotatable relative to each other about the elongated main body longitudinal axis, wherein the first segment and the second segment are arranged at opposite end regions of the torsion spring, wherein there is provided at least one elastically stretchable spring element, wherein the at least one elastically stretchable spring element is in a form of an elongated element in its non-deformed state and the at least one elastically stretchable spring element has a first end region and a second end region, the first end region and the second end region being provided at opposite ends of the at least one elastically stretchable spring element, wherein the first end region of the at least one elastically stretchable spring element is provided with a first coupling region that is fixed to the first segment of the elongated main body by a first fixing element and the second end region of the at least one elastically stretchable spring element is provided with a second coupling region that is fixed to the second segment of the elongated main body by a second fixing element, wherein the at least one elastically stretchable spring element couples to the first segment and/or to the second segment of the elongated main body in a region of an outer periphery of the first segment and/or of the second segment of the elongated main body, wherein upon torsional stressing of the torsion spring, a spacing of the first segment of the elongated main body to the second segment of the elongated main body in a longitudinal direction of the torsion spring does not change substantially or does not change, wherein the at least one elastically stretchable spring element couples to the first segment and/or to the second segment of the elongated main body outside the longitudinal axis of the elongated main body, and wherein upon rotation of the first segment and the second segment of the elongated main body relative to each other about the longitudinal axis of the elongated main body, the at least one elastically stretchable spring element is wound around the elongated main body and the at least one elastically stretchable spring element experiences a reversible elongation of the elongated element around the elongated main body.

22. A torsion spring for a winding drum, comprising:

an elongated main body having a longitudinal axis, the elongated main body includes at least a first segment and a second segment which are rotatable relative to each other about the elongated main body longitudinal axis, wherein the first segment and the second segment are arranged at opposite end regions of the torsion spring, wherein there is provided at least one elastically stretchable spring element, wherein the at least one elastically stretchable spring element is in a form of an elongated element in its non-deformed state and the at least one elastically stretchable spring element has a first end region and a second end region, the first end region and the second end region being provided at opposite ends of the at least one elastically stretchable spring element, wherein the first end region of the at least one elastically stretchable spring element is provided with a first coupling region that is fixed to the first segment of the elongated main body by a first fixing element and the second end region of the at least one elastically stretchable spring element is provided with a second coupling region that is fixed to the second segment of the elongated main body by a second fixing element, wherein upon rotation of the first segment and the second segment of the elongated main body relative to each other about the longitudinal axis of the elongated main body, the at least one elastically stretchable spring element is wound around the elongated main body and the at least one elastically stretchable spring element experiences a reversible elongation, wherein the at least one elastically stretchable spring element couples to the first segment and/or to the second segment of the elongated main body outside the longitudinal axis of the elongated main body, wherein the elongated main body includes at least one further segment arranged in a longitudinal direction of the elongated main body between the first segment and the second segment and the at least one further segment is rotatable about the elongated main body longitudinal axis relative to the first segment and the second segment and that the at least one elastically stretchable spring element couples to the at least one further segment, wherein the elongation of the at least one elastically stretchable spring element causes rotation of the at least one further segment about the longitudinal axis of the elongated main body, and wherein the at least one further segment comprises a holding region to which the at least one elastically stretchable spring element couples, wherein the holding region is arranged at an outer periphery of the further segment.

23. A torsion spring comprising: wherein the torsion spring is disposed as a drive device for a winding drum, an elongated main body having a longitudinal axis, the elongated main body includes at least a first segment and a second segment which are rotatable relative to each other about the elongated main body longitudinal axis, wherein the first segment and the second segment are arranged at opposite end regions of the torsion spring, wherein there is provided at least one elastically stretchable spring element, wherein the at least one elastically stretchable spring element is in a form of an elongated element in its non-deformed state and the at least one elasticallystretchable spring element has a first end region and a second end region, the first end region and the second end region being provided at opposite ends of the at least one elastically stretchable spring element, wherein the first end region of the at least one elastically stretchable spring element is provided with a first coupling region that is fixed to the first segment of the elongated main body by a first fixing element and the second end region of the at least one elastically stretchable spring element is provided with a second coupling region that is fixed to the second segment of the elongated main body by a second fixing element, wherein the at least one elastically stretchable spring element couples to the first segment and/or to the second segment of the elongated main body outside the longitudinal axis of the elongated main body, and wherein upon rotation of the first segment and the second segment of the elongated main body relative to each other about the longitudinal axis of the elongated main body, the at least one elastically stretchable spring element is wound around the elongated main body and the at least one elastically stretchable spring element experiences a reversible elongation of the elongated element around the elongated main body.

* * * * *